United States Patent [19]

Frisz et al.

[11] 3,938,449

[45] Feb. 17, 1976

[54] WASTE DISPOSAL FACILITY AND PROCESS THEREFOR

[75] Inventors: James O. Frisz, Los Angeles; Harold A. Price, Anaheim, both of Calif.

[73] Assignee: Watson Industrial Properties, Los Angeles, Calif.

[22] Filed: Mar. 18, 1974

[21] Appl. No.: 451,859

[52] U.S. Cl. ............ 110/8 C; 110/8 A; 110/8 P; 110/10; 110/14; 110/49 R
[51] Int. Cl.² ............... F23G 5/12; F23G 5/06
[58] Field of Search ............ 110/7 R, 7 B, 7 S, 8 R, 110/8 A, 8 B, 14, 15, 49 R

[56] References Cited
UNITED STATES PATENTS

| | | | |
|---|---|---|---|
| 3,310,009 | 3/1967 | Jacobs | 110/8 A |
| 3,515,078 | 3/1969 | Maitilasso | 110/8 |
| 3,589,313 | 6/1971 | Smith et al. | 110/8 |
| 3,604,375 | 11/1971 | Bruns et al. | 110/7 |
| 3,685,467 | 8/1972 | Morrill | 110/8 |
| 3,725,538 | 4/1973 | Brewer | 110/8 |
| 3,734,036 | 5/1973 | Abos | 110/8 |
| 3,741,890 | 6/1973 | Smith et al. | 110/8 |

*Primary Examiner*—Kenneth W. Sprague
*Attorney, Agent, or Firm*—George J. Netter

[57] ABSTRACT

Solid wastes are dumped into a receiving pit and a conveyor transfers them to a separate station where salvage operations are performed. Adjacent the salvage station a saw cuts waste wood to manageable lengths, which is conveyed with the other wastes to a shredder for reduction in size, after which the entire waste batch passes through a magnetic separator where magnetically attractable materials are removed. A waste oil burner removes combustibles adhering to the magnetic materials. The sized wood and other solid wastes may then be optionally passed through a further sizing mill as well as further dehydration and then transported to one of a plurality of silos for temporary storage. Each silo can deliver wastes to any one of several rotary kilns. The kilns are operated at their input end in low oxygen with temperature control effected by feedback flue gases. Waste oils are the ignition fuel with hot air from an economizer promoting auto-ignition. Stoichiometric combustion occurs here with the temperature held below 2200°F. to prevent production of harmful nitrogen oxide gases. After passing the kiln hot gases through a steam generator, they are fed back to several different stations in the facility to preheat and dehydrate the waste materials. As a final step, the gaseous output from the kilns is sent to a scrubber and thence to evaporation ponds where solid material from the gases is deposited. Heat from the process is used to generate steam for external utilization.

13 Claims, 15 Drawing Figures

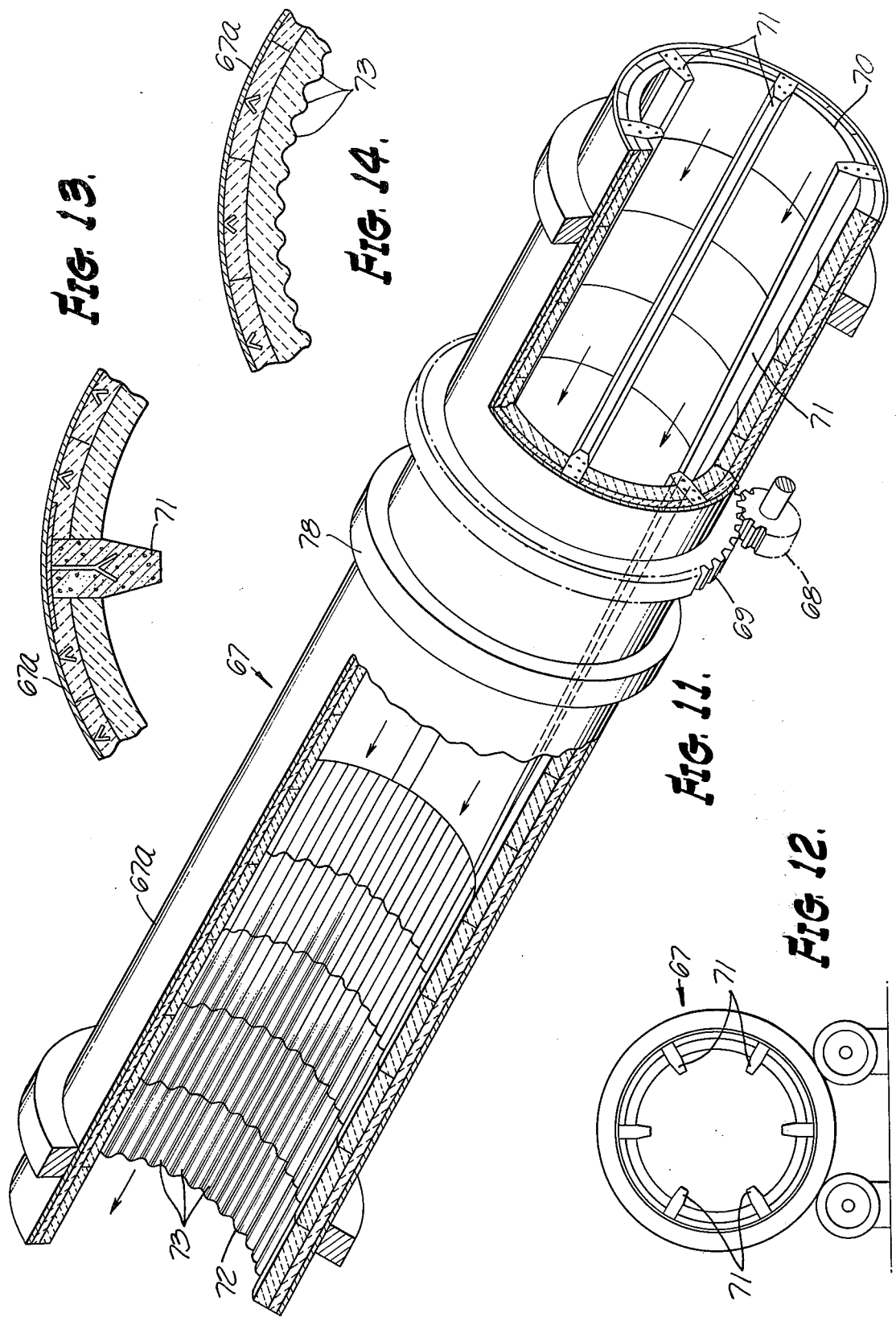

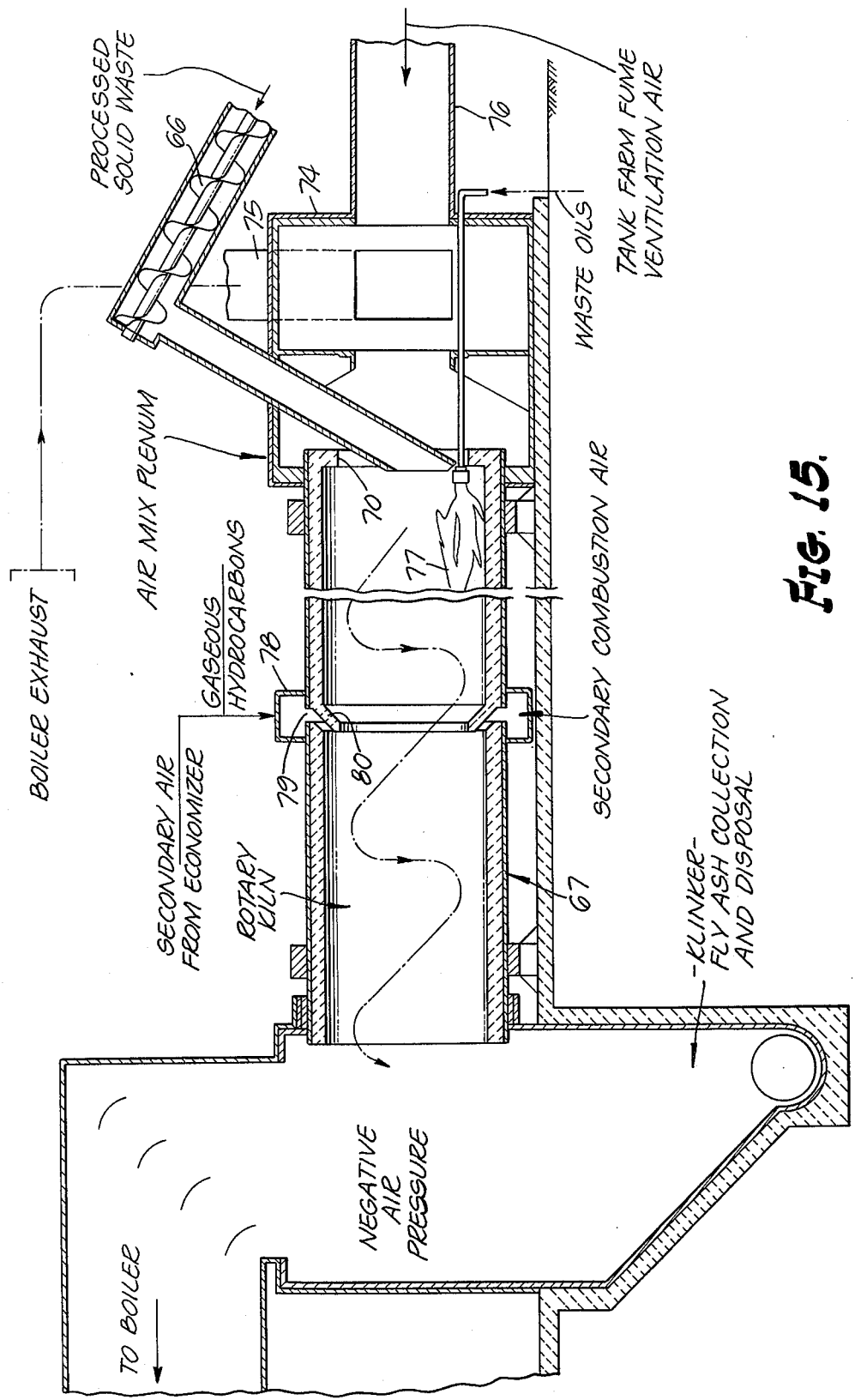

WASTE DISPOSAL FACILITY AND PROCESS THEREFOR

The present invention relates generally to a facility for disposing of waste materials and process therefor, and, more particularly, to such a facility and process for converting waste materials to a form which can be readily disposed of, and is non-polluting.

BACKGROUND AND FIELD OF THE INVENTION

An ever increasing problem, particularly in urban areas, is the disposal of the solid and liquid wastes produced both by individuals and industries. Such waste materials can take a great variety of different forms and sizes and have a corresponding variety of different chemical compositions. For example, such wastes can be found to include paper, wood, metal, plastic, glass, garbage, grease, oils, soil and the like, either alone or in combined form. Certain of these materials break down easily on the application of heat (e.g., wood, paper and certain plastics), whereas others such as inerts, metals, earth and the like, for example, are relatively unaffected by heat except at very high temperatures. In any event, all of the waste materials, unless they can be reclaimed or recycled for future use, must be disposed of, since their presence in large accumulation is hazardous to the health and well being of humans.

One approach to waste disposal that has been frequently relied upon in the past is to utilize the waste materials for landfill. This, of course, presupposes the availability of the requisite amount of land suitable for this purpose. It is clear that many of the urban areas are simply not able to use this technique, either through a general shortage of available land for this purpose, or due to the fact that the distance of the available landfill areas from the waste disposal sources is prohibitively great.

Another technique which has been relied upon extensively in the past, but is no longer acceptable, particularly in urban areas, is that of incinerating the combustible waste materials. Incineration or open air combustion of waste materials, unfortunately, produces large amounts of polluting gases and gases containing suspended materials. In fact, most urban communities have now promulgated very strict ordinances controlling the release of such polluting materials into the atmosphere, and for this reason, incineration is no longer a feasible approach to waste disposal.

Still other approaches have included combinations of landfilling and incineration, as well as changing the form of the waste material by cutting or sizing to make it more amenable to further processing. In addition, salvage operations are frequently conducted to remove certain items from the waste batch for recycled use. Examples of a few such materials commonly reclaimed are metals, returnable bottles, certain types of plastic containers, rubber tires, paper base materials and apparatus such as refrigerators, washers, dryers or other appliances. The latter items not only may possess recyclable or resale value in themselves, but also could pose a handling problem by jamming or otherwise making the disposal equipment inoperative.

In all facilities where combustion oxidation has been used for waste disposal, it has been necessary in the past to provide additional fuel to achieve pyrolysis or incineration, e.g., oil or natural gas. This, of course, adds to the overall expense of a waste disposal operation, and, in many cases, raises it to prohibitively high levels. Also, of course, with the increasing shortage of fossil fuels, waste disposal systems based upon the need for use of such high quality fuels are neither economically feasible, nor, perhaps, even supportable at this time.

Certain types of solid waste materials are especially difficult to handle and in the past have necessitated special handling. For example, wood, as obtained from a demolished house or building, may not only come in rather large pieces of varying shape, but also has a high BTU output which must be taken into account in any process involving disposal by combustion oxidation. As will be described herein, the subject invention is particularly adaptable for the disposal of wood, and, in fact, utilizes it as a basic fuel for the heat destruction of other waste materials.

Still further, there are many inflammable liquid waste materials which must be disposed of. For example, there are so-called "light ends" produced in refineries as well as used solvents and cleaning agents from the dry cleaning industry which are highly inflammable and pose a unique disposal problem. In the past, it was considered necessary to store and dispose of such liquids spearately, due to their high volatility.

OBJECTS AND SUMMARY OF THE INVENTION

It is, therefore, a primary aim and object of the subject invention to provide an improved facility and process for converting solid, and certain petroleum derived liquid and solid (coke) wastes to a non-pollutant, easily disposed of form.

Yet another object of the invention is the provision of a facility and process in which certain components of the waste materials are utilized as a fuel for reducing all the combustible waste components to a non-polluting form.

Yet another object of the invention is the provision of equipment and a process for the reduction of solid and liquid waste materials to a safely disposable form through stoichiometric combustion while maintaining the temperature of such materials below a range for producing nitrogen oxides.

A further object is the provision as in the described objects in which flue gases are used to maintain firing temperature below that at which undesirable nitrogen oxides are produced.

Still another object is the provision of equipment and a process for treating solid wastes generally and petroleum derived wastes attendant disposal thereof in which the waste materials are reduced in a rotary kiln fired by a fuel consisting of wood and light end petroleum products.

A still further object of the invention is the provision of a facility and process for disposing of liquid and solid wastes as in the described objects in which heat used in reducing the wastes is also used to produce useful quantities of steam.

In a facility practicing the process of the present invention, solid waste materials are carried to the facility site via trucks, for example, where they are dumped into a receiving pit. Auger or screw feeders move the solid waste onto a conveyor for transfer to a separate station where salvage operations are performed, e.g., removing reclaimable bottles. Adjacent the salvage station there is provided a power driven saw for cutting waste wood to predetermined manageable lengths. The cut wood and other waste materials minus the salvaged items are then conveyed to a shredder where the waste including wood are further reduced in size to relatively small particles and dehydrated, after which the entire waste batch passes through a magnetic separator where magnetically attractable materials are removed. A rotary burner removes paper or other combustibles that adhere to the magnetically attractable materials, fuel for this burner is liquid waste oil. After cleaning, the ferrous materials are then removed for shipping to a desired location.

The properly sized wood materials and other solid wastes are then optionally passed through a further sizing mill where they are also dehydrated further and then transported to one of a plurality of silos for temporary storage.

Each of the storage silos is interconnected to deliver the waste materials to any one of several rotary kilns. The kilns are operated at their inputs ends in a stoichiometric oxygen condition with temperature control effected by feedback flue gases. Waste oil materials act as the primary ignition fuel plus hot air from an economizer which promotes auto-ignition of many waste components. This establishes a sufficient temperature for stoichiometric combustion of the waste mass while maintaining the temperature below approximately 2200°F. to prevent production of harmful nitrogen oxide gases. After passing the kiln hot gases through a steam generator, these gases are fed back to several different stations in the facility to preheat the waste materials and thereby remove moisture which is beneficial to the kiln operation and avoids the need to release the moisture at a single point giving rise to an objectionable cloud of moisture.

Steam produced through utilization of the kiln heat is transmitted via conduits to adjacent industries, for use in the waste disposal facility itself, or for generation of electric power. Although in many cases waste oils used as an auxiliary fuel in the kilns can be obtained in a form permitting direct firing in the kilns, in other circumstances they may require further processing before such use. For example, frequently waste liquid hydrocarbons when obtained are highly viscous and must be stored in tanks or separators from which the nonusable highly viscous components are removed, leaving the useful fuel materials. The nonusable waste material from the treating tanks or separators is frequently passed to a so-called mud pond.

As a final step in the process of the facility, the gaseous output from the rotary kilns after the heat has been exchanged in the steam boilers and further used as described, is sent to a scrubber and thence to evaporation ponds where solid material from the gases is deposited. Periodic removal of the sludge from the evaporation ponds is accomplished.

DESCRIPTION OF THE DRAWINGS

FIG. 11 is a perspective, partially sectional view of a rotary kiln as used in the facility of this invention.

FIG. 12 is an end elevational view of the entrance to the rotary kiln of FIG. 11.

FIG. 13 is a sectional, partially fragmentary view of the entrance end of the rotary kiln of FIG. 11.

FIG. 14 is a sectional, partially fragmentary view of the exit portion of the rotary kiln of FIG. 11.

FIG. 15 is a sectional, side elevation of a rotary kiln as in FIG. 11 and associated feed and control apparatus.

DESCRIPTION OF A PREFERRED EMBODIMENT

Figure 1:
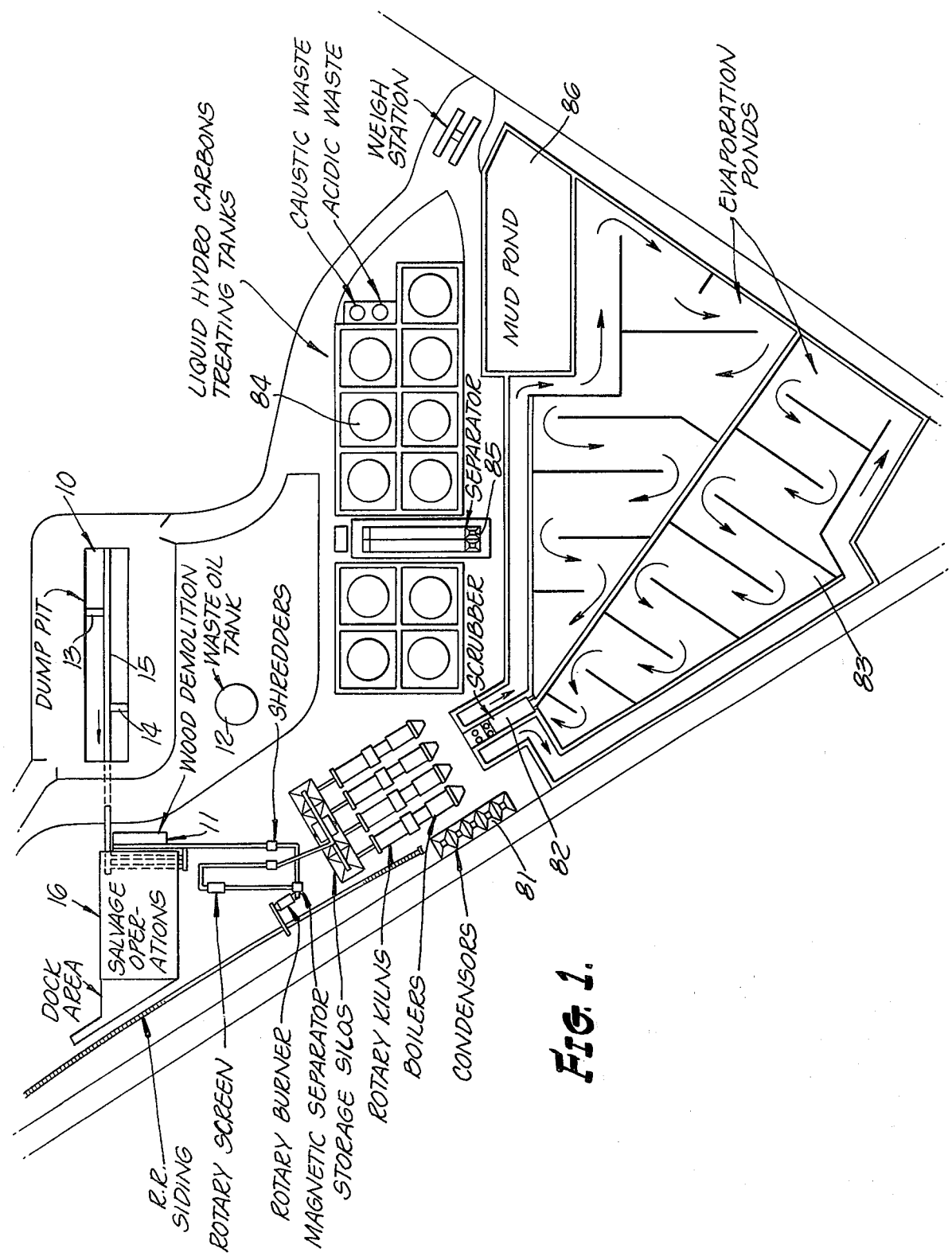
FIG. 1 is a schematic plan view of the overall facility for practicing the waste disposal process of this invention.
Figure 2:
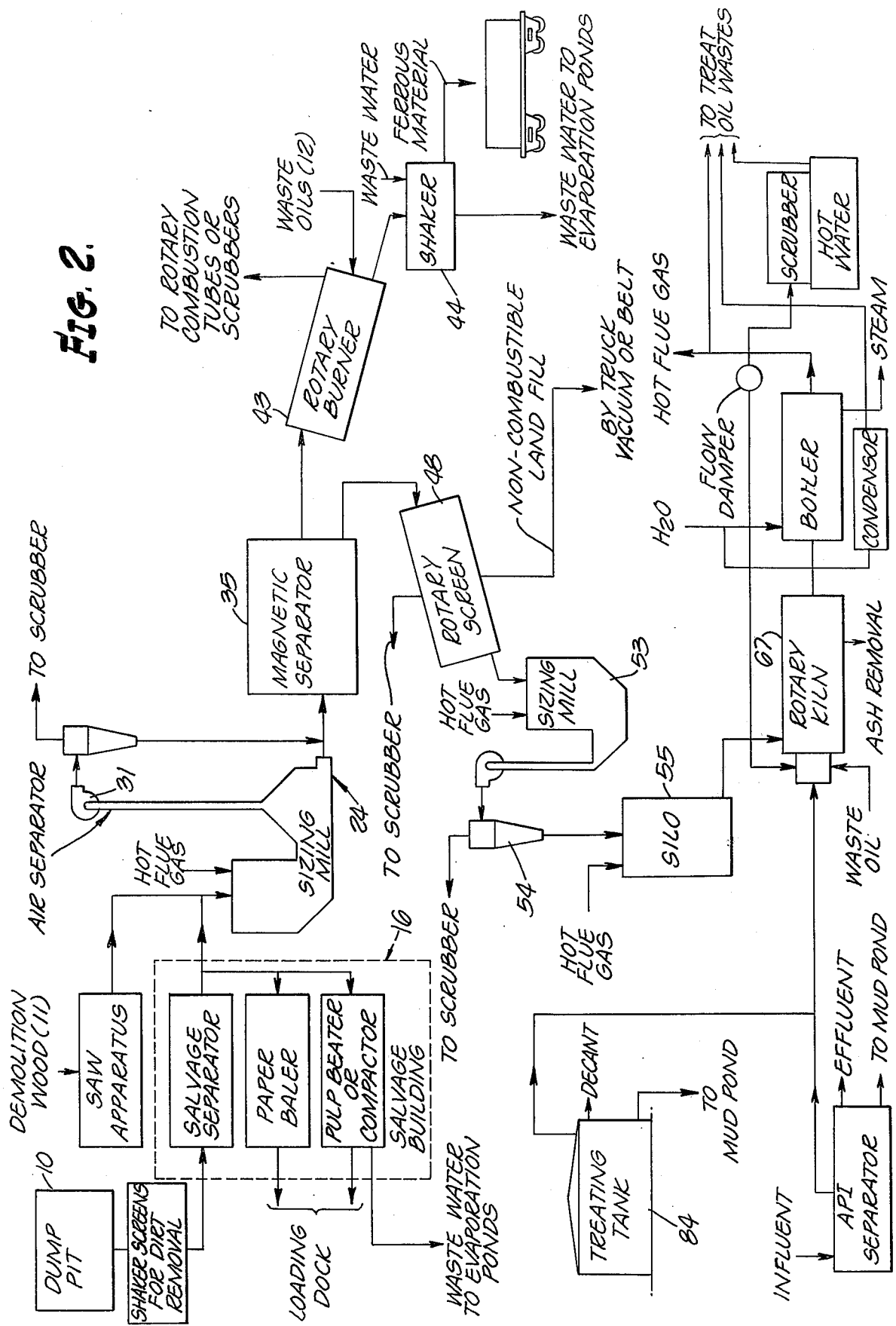
FIG. 2 is a schematic flow diagram of the process of the invention.

With reference now to both FIGS. 1 and 2, a description will be given of the major aspects of the facility and process of this invention for disposing of waste materials. Solid waste is conventionally picked up at the source location and transported to the disposal facility by trucks where they are unloaded into a dump pit 10. An exception to this is the large items of wood from a torn down building, for example, and which are delivered by separate vehicles to another location 11, also identified as Wood Demolition. Liquid wastes such as refinery wastes, "light ends", cleaning solvents and the like, are stored in suitable containers or tanks 12 for use in the disposal process to be more particularly described later herein.

The dump pit 10 includes a pair of traveling feeders 13 and 14 which move the solid wastes onto a moving conveyor 15 which carries the wastes to a station 16 where salvage operations are conducted. That is, removal of paper, aluminum cans, bottles or other items which may be reclaimed or recycled. The salvaged items are removed from the waste material mass and handled separately.

Figure 3:
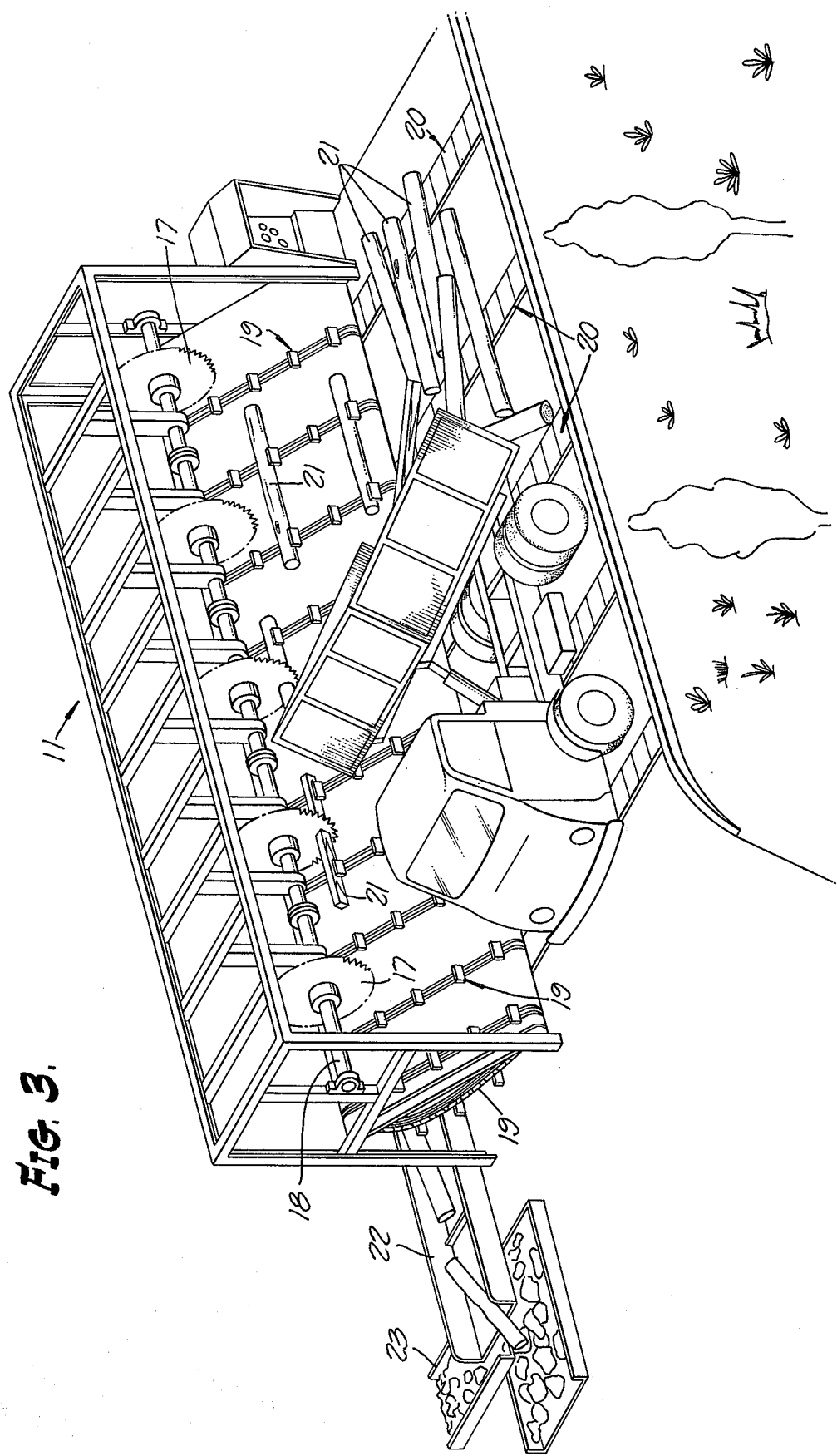
FIG. 3 is a perspective view of a station for cutting wood to predetermined lengths prior to further processing.
Figure 4:
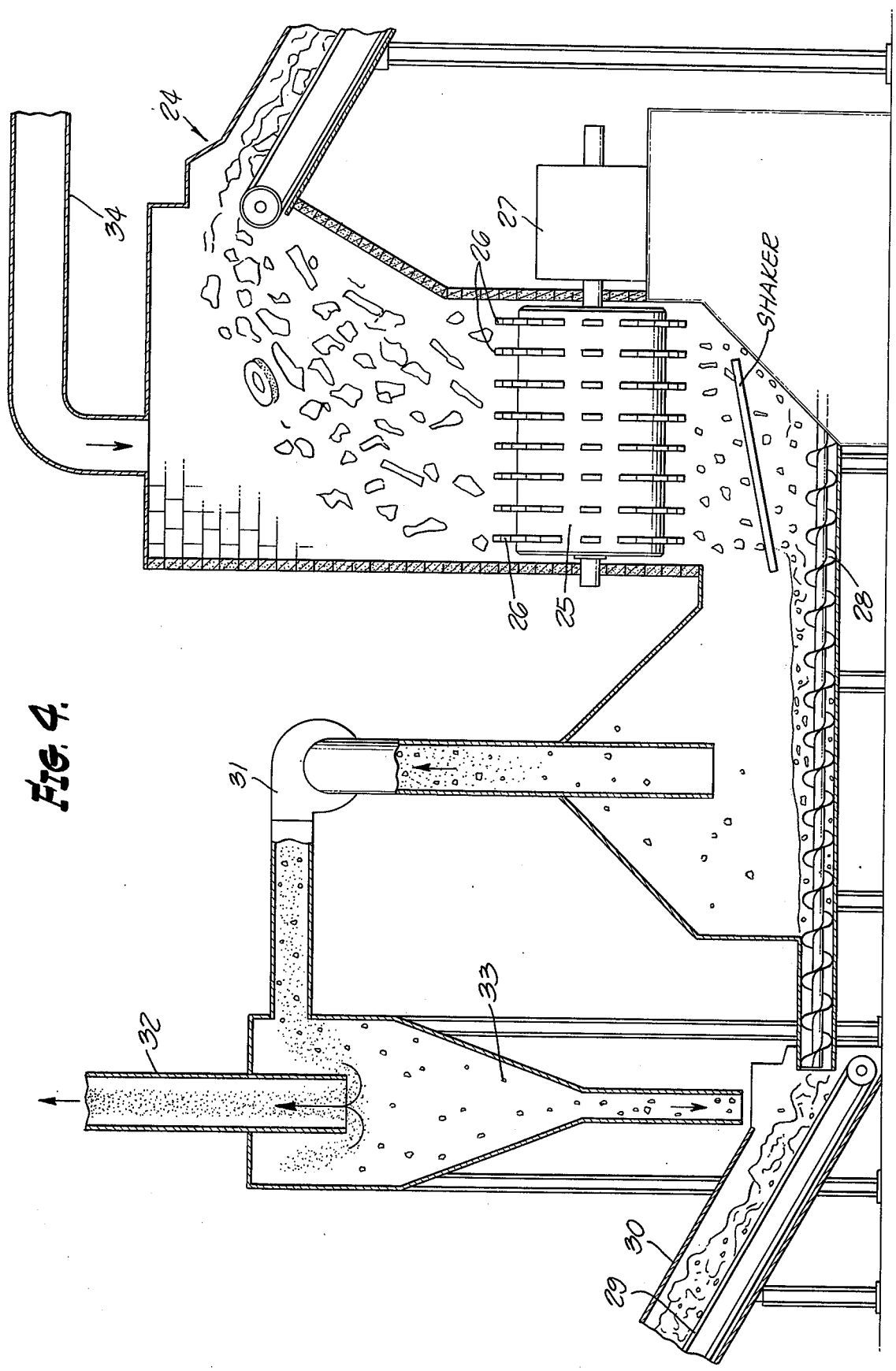
FIG. 4 is a side elevational, partially sectional view of a sizing mill for reducing solid wastes to a given maximum dimension.

As shown in FIG. 3, the wood demolition station 11 includes a plurality of circular saw blades 17 mounted on a common drive shaft 18 and arranged along the shaft at a predetermined spacing. Inclined conveyors 19 cooperate with drag chains 20 on the unloading deck to move the wood 21 against the saw blades for cutting to a predetermined maximum length. The cut wood drops onto a conveyor 22 and is merged with the waste materials from conveyor 23. By dumping from an end-unload truck, the wood will be generally oriented parallel to conveyor 19 grippers, thereby insuring proper conveyance to the blades for cutting.

The cut wood and other solid wastes from the salvage station are then transferred to a sizing mill or shredder 24 where the materials are reduced to a size considered maximum for optimal operation of this disposal process. Specifically, the mill includes a rotor 25 having teeth or shredding members 26 which engage and reduce all the waste materials to preferably less than about 4 inches across. A suitable rotative power source 27, such as an electric motor, diesel engine or steam turbine is provided. The sized waste is then fed by a horizontal screw 28 to an exit conveyor 29 through an air sealed plenum 30. Fan apparatus 31 induces an air draft in the direction of the arrow for removing dust and other small suspended material to the scrubber (to be described later) via conduit 32. The heavier materials temporarily entrained within the air stream from fan 31 fall onto the exiting wastes as at 33.

Hot flue gases from a source to be described later are directed via a conduit 34 onto the solid wastes coming into the shredder to partially dehydrate them.

Figure 5:
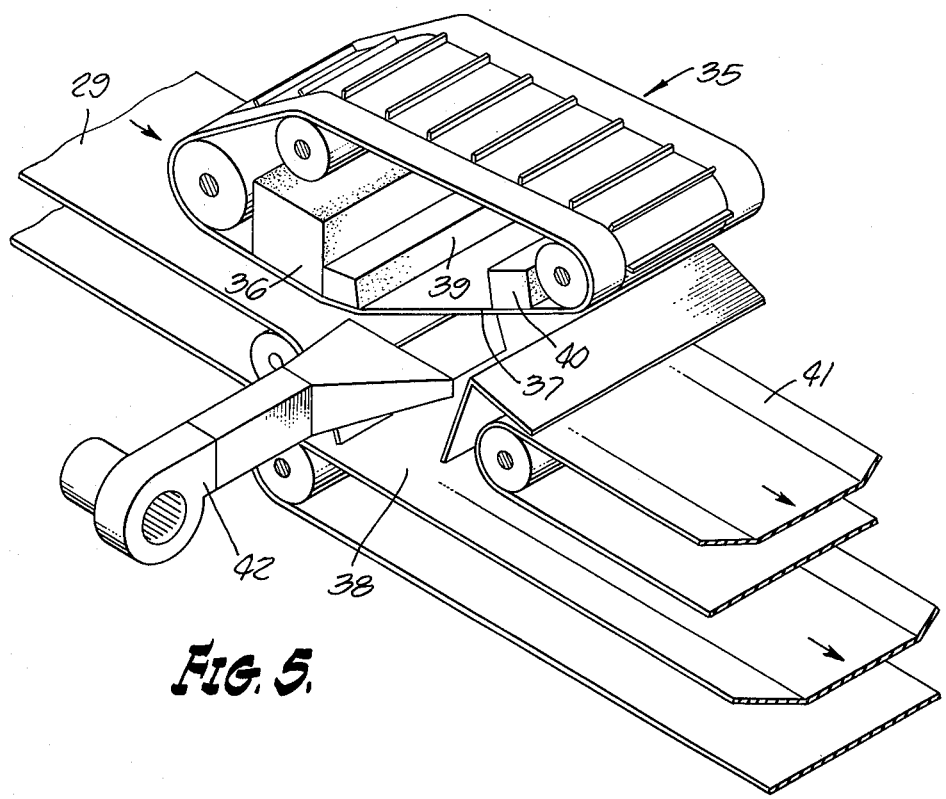
FIG. 5 is a perspective, elevational, partially sectional view of a magnetic separator.

The properly sized wastes and wood are now conveyed via 29 to a magnetic separator 35 where ferrous materials are removed. Reference is now made to FIG. 5 for the following detailed discussion of magnetic separation. The conveyor 29 moves the wastes under and within attractive range of pick-up magnet 36 located on the opposite side of a moving continuous belt 37. The ferrous articles are magnetically held to the underside of belt 37 and thereby removed from conveyor 29 with the non-magnetizable wastes falling onto a further conveyor 38. The attracted ferrous articles are sequentially moved past a transfer magnet 39 and an oppositely poled discharge magnet 40 which ejects the ferrous articles onto a belt conveyor 41. A force fan 42 directs pressurized air across the lower surface of belt 37 to remove any loosely held non-magnetizable matter from the ferrous articles, most commonly, paper.

Figure 6:
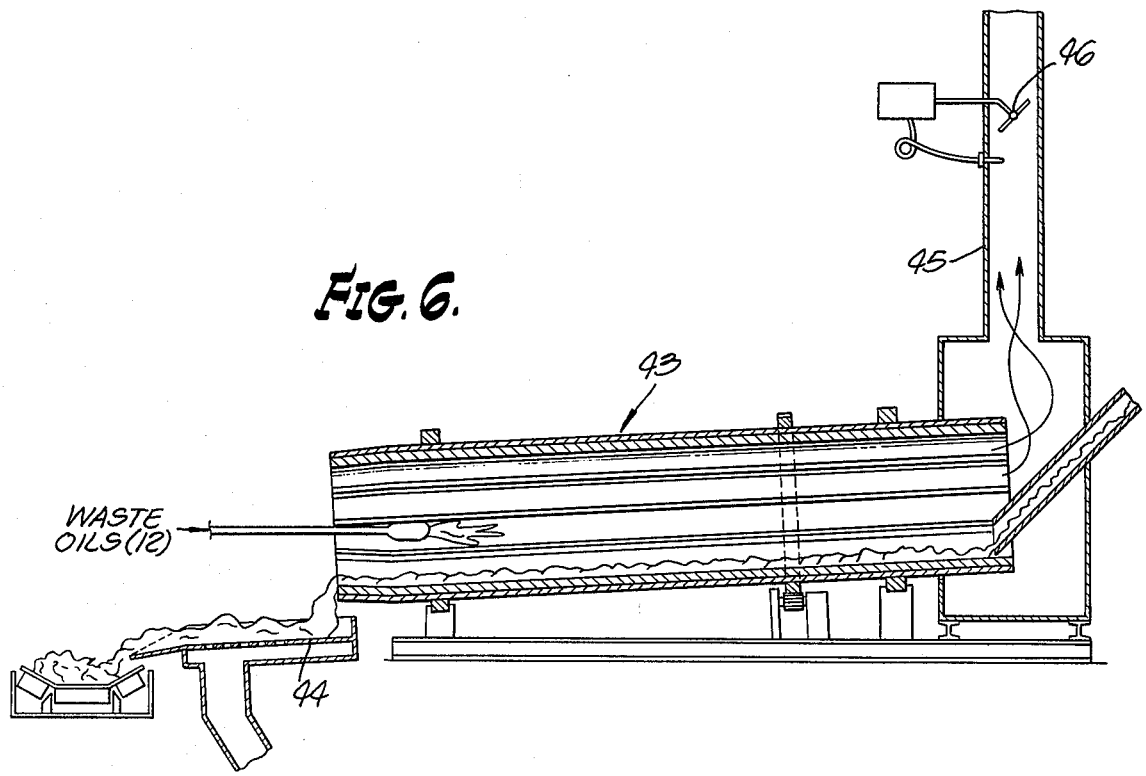
FIG. 6 is a side elevational, sectional view of a rotary burner for removing combustible material from ferrous materials.

Conveyor 41 routes the ferrous articles from the separator 35 to a rotary burner 43 (FIG. 6), where all combustible matter adhering to the metal or integrally related to it is removed. Specifically, the burner 43 includes a hollow tubular body canted with respect to the horizontal and rotated about its longitudinal axis. The ferrous articles are conveyed into the higher end of the burner and waste oils from 12 are fired in the lower burner end. Rotation of the burner assisted by mixing action of longitudinally extending vanes on the burner internal walls causes the ferrous materials to move along the burner tube and out the lower end for conveyance first to a shaker 44 and then to an accumulation station, e.g., railroad siding, for transportation to a user or purchaser. The flue gases are removed via conduit 45 with conventional suspended matter suppression being accomplished as at 46.

Figure 7:
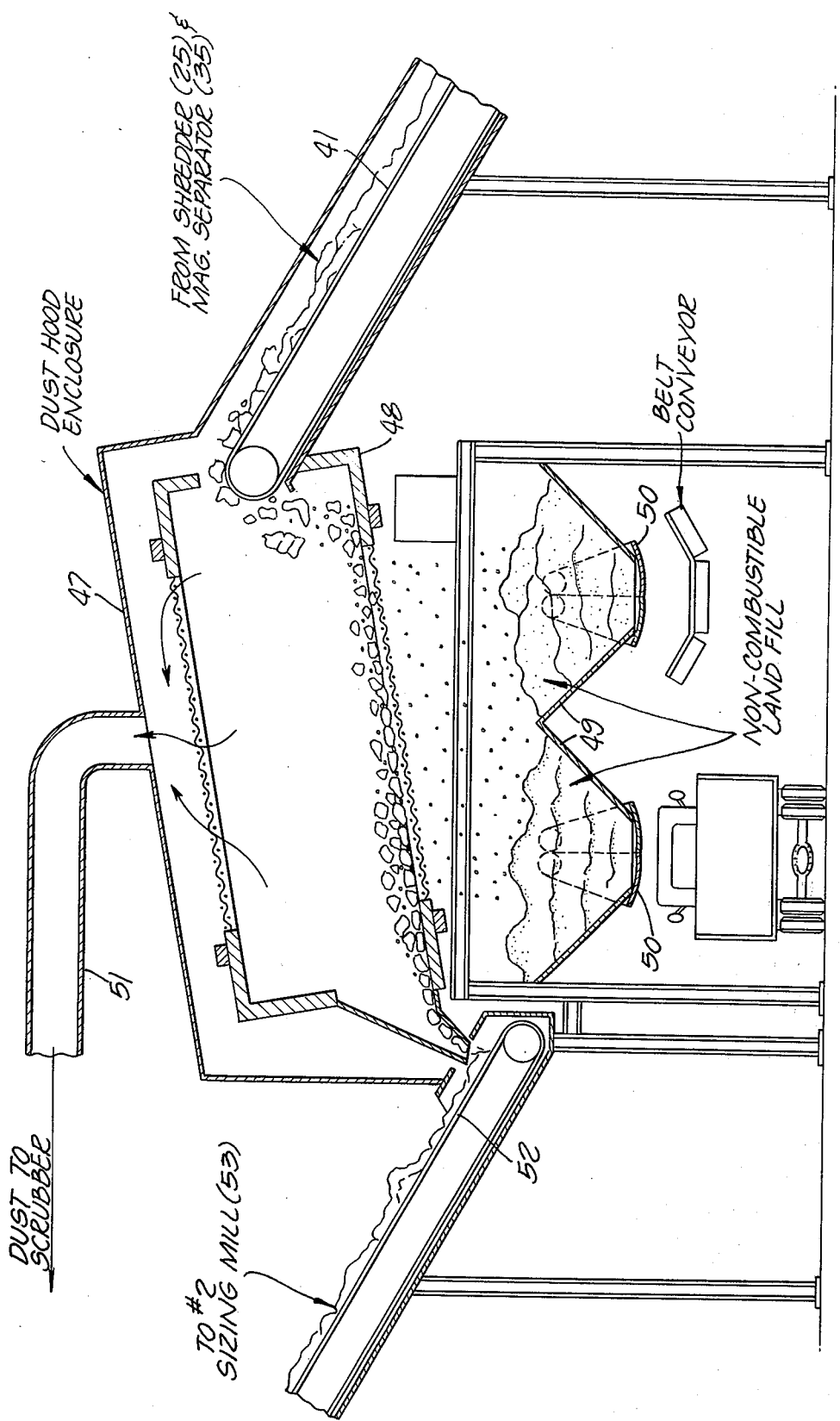
FIG. 7 is a sectional elevational view of a station at which particle sized inerts, e.g., soil, are removed.

As shown in FIG. 7, the waste materials on conveyor 41 are then transferred to a hooded enclosure 47 where they are dropped onto a rotating screen 48 having a relatively fine mesh via which dirt and other inerts are removed. Specifically, the wastes are dropped into bins 49 having selectively openable lower doors 50 for loading directly into a truck, for example. Dust from the screen 48 is transferred through a conduit 51 to a scrubber to be described.

The solid wastes which are too large to be removed by the screen 48 pass out the lower end of the screen to a conveyor 52 where they are moved to a second sizing mill 53 where the material is reduced to a maximum dimension of about 1.5 inches, which has been found to be the preferable size for storage and heat reduction in the manner to be described. Although many types of wastes can be sized directly in one mill to the required 1.5 inches, many other types cannot (particularly wooden timbers, beams and the like), and for that reason two step sizing in two mills may be used. The mill 53 can be identical in construction to the first mill 24 already described, except for the rotor which has teeth of a size and arrangement to produce the desired smaller sized particles. As in the case of the first mill, hot flue gases are fed back to the second mill for dehydrating the wastes.

Figure 8:
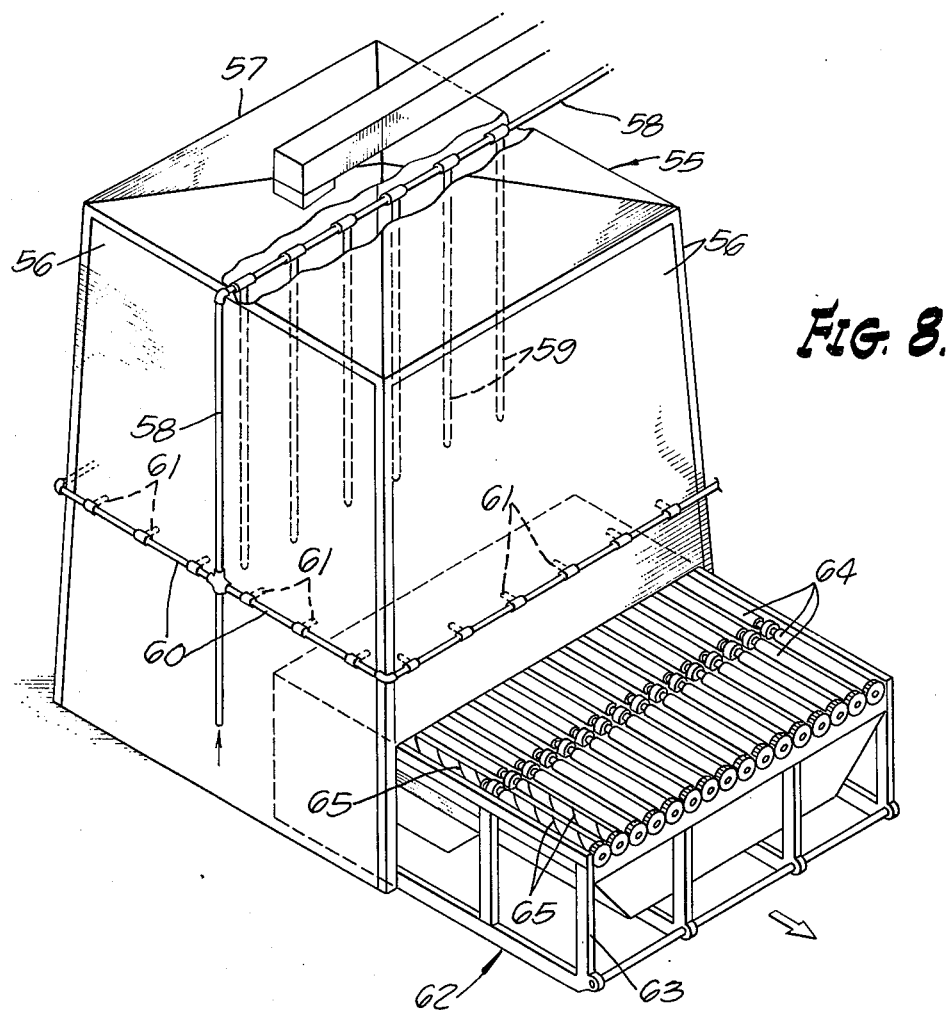
FIG. 8 is a perspective, partially sectional view of a storage silo into which materials are received immediately prior to heat reduction thereof.

The relatively small sized waste materials from the second mill 53 are now entrained in a hot dry air stream and transported along a conduit to so-called cyclone separators 54 located above several storage silos 55, one of which is depicted in FIGS. 7 and 8. More particularly, the silo includes trapezoidal side walls 56 joined together at their edges to form an enclosure with the walls flaring outwardly to a maximum at the bottom. A ceiling wall 57 closes the storage space and supports the separator 54 from which waste materials to be stored are received. The outwardly sloping walls prevent wastes from bridging during storage within the silos.

A first pipe 58 extends vertically along the center line of one of the side walls 56 and across the ceiling wall 57, with a plurality of outlet pipes 59 depending from the ceiling section. A feeder pipe 60 interconnects with 58 and extends horizontally about at least three side walls 56 and has a plurality of outlets 61 disposed within the silo. Hot flue gases from burners to be described is pressurized and passed through the pipes 58 and 60 for emission into the stored waste material mass of the silo to dehydrate the material and remove oxygen. The temperature of the dehydrating gases used here, as well as those fed back to the first and second sizing mills, is maintained below 360°F., which is an empirically determined lowest auto-ignition temperature for solid wastes.

Figure 9:
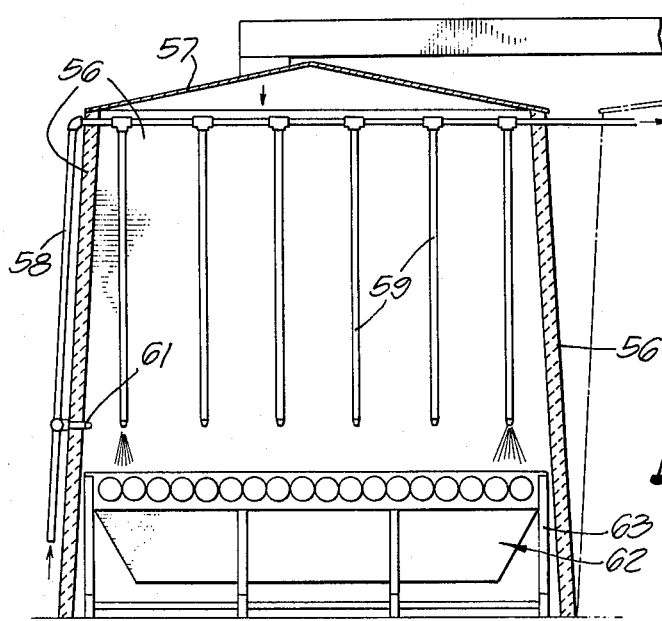
FIG. 9 is an end elevational sectional view of the storage silo of FIG. 8.

The lower portion of each silo 55 includes a conveyor assembly 62 which is readily removable from the silo as a unit to enable removing of the waste materials from the silo in the case of an emergency, e.g., breakdown of the conveyor assembly. In particular, the assembly includes a support frame 63 which is slidably received within the silo through an opening in the lower portion of a side wall 56. The conveyor upper surface includes a plurality of driven rollers 64 with fingers 65 on the roller peripheries which break up clumps of other large groupings of the wastes that may be produced during storage in the silo as they are passed therebetween to a lower screw conveyor (FIGS. 9 and 10).

The number and capacity of the silos is chosen to provide ample waste storage for the longest expected down-time. In the usual case, storage for three days is sufficient, since this will cover the situation where a non-work Monday or Friday is coupled with the weekend which may also be normal non-work days. Also, by having extra silo capacity, this permits continued operation when it is necessary to repair one of the silos or its included feed and conveyor apparatus.

Figure 10:
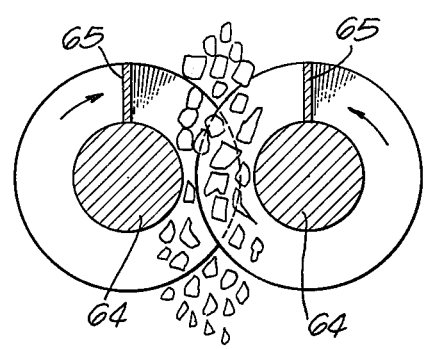
FIG. 10 is an enlarged, sectional, end elevational view of the conveyor rollers as used in the storage silo of FIGS. 8 and 9.

A screw conveyor 66 selectively feeds the waste materials from the silos through separate sealed conduits to any one of several rotary kilns 66, one of which is depicted in FIG. 10. As shown there, the kiln includes a hollow, open-ended circular tube body 67 which is mounted for driving rotation about its circular axis by gears 68 and 69. From the kiln entrance end 70, for approximately one-half the kiln length, there are provided a plurality, (e.g., six), radially inward extending vanes or splines 71 on the body inner wall surface. The vanes taper from a maximum inward extension at the entrance end to a minimum at their inner terminus. The inner kiln wall surface from the center to the material output or exit end 72 is formed into a large number of closely spaced longitudinally extending corrugations 73.

With reference now to FIG. 15 in addition to FIG. 11, the kiln entrance end 70 is enclosed by a plenum chamber 74 which is interconnected via conduit 75 with the hot gases from the same kiln after they have fired a steam generation boiler (BOILER EXHAUST). Moreover, the various oil tanks and hydrocarbon treating tanks on the facility (FIG. 1) are provided with air ventilation, the final product of which is fed by conduit 76 into the air mix plenum 74. Both gaseous inlets via 75 and 76 are low in oxygen such that the combustion of the waste materials in the kiln entrance 70, ignited by a waste oil flame 77, approaches stoichiometric. Also, the combustible components of the ventilation air from the tank farm are themselves burned in the kiln, thereby eliminating an air pollutant.

As seen best in FIG. 15, the kiln tube 67 comprises two spaced parts arranged end-to-end with a circumferential manifold 78 enclosing the space 79 between the parts. An annular wall 80 on the inner end of the kiln entrance part tapers axially into the kiln exit part, thereby preventing hot, oxygen-rich air supplied to the manifold 78 from, say, an economizer from entering back into the kiln entrance part and, instead, insures this air is added only to the kiln exit part to complete combustion.

In summary of kiln combustion, first stoichiometric combustion is achieved in the entrance part, followed by completed combustion in the exit part from additional oxygen added via the manifold 78. Moreover, kiln temperature is controlled so as not to exceed the temperature at which undesirable nitrogen oxides are formed by adjusting the boiler exhaust feedback. Maintaining kiln temperature below the prescribed maximum has the further advantage that materials such as low melting glasses and certain sands do not produce slagging of the kiln.

As combustion progresses in the kiln, radiant heat causes the ceramic lining to be hotter than the combustion gases, which lining aid combustion of the wastes as they are tumbled along the rotating kiln.

Summarizing kiln operation, waste oils are inserted and ignited at the entrance end of the kiln along with the incoming waste materials in a low oxygen atmosphere. Accordingly, substantial reduction of the waste materials takes place in the leading or front end of the kiln. Heated oxygen-rich air (350–450°F.) obtained from an air economizer located at the exit ends of steam boiler heat exchangers is pressurized and introduced via plenum 78 into the kiln, providing a second stage of complete combustion. By this two-stage treatment, it is made possible to effect a relatively slow release of energy in the entrance portion of the kilns, which, in turn, controls the production of combustible gaseous effluents resulting from incomplete combustion.

As a further aspect, in the event that relatively hard to burn materials may exist in the waste materials being disposed of (e.g., rubber tires), gaseous or easily vaporized hydrocarbons may be added to the air in the plenum 74 to assist the combustion process.

As already noted, the heat produced in the rotary kilns is utilized in the production of steam which can either be used in the waste disposal facility itself or transmitted to adjacent industries for their use. In the event demand for the steam is less than production, a number of steam condensers 81 (FIG. 1) convert the unused steam into water for use in the facility, e.g., scrubbers.

The solid materials remaining after the two-stage firing in the rotary kilns are non-polluting and may be safely disposed of as land fill or any other suitable manner representing only a small amount in percent by weight of the original wastes. The gaseous products from the kilns are sent to a conventional scrubber 82 where they are water washed to remove suspended matter, the effluent being conduited to evaporation ponds 83. There are two such ponds so that when one must be dredged, the other may be used.

It is contemplated that liquid hydrocarbons in a variety of different forms may be provided to the facility and from which the light ends are obtained for firing the kilns. Tanks 84 are provided for storage on the facility along with appropriate equipment for separating out the desired light ends, e.g., separator 85, with the remaining material being delivered to a mud pond 86. In addition, separate supplies of caustic and acidic wastes are maintained for treating the liquid hydrocarbons as needed.

We claim:

1. Process for non-pulluting disposal of solid wastes collected at a first location, which comprises:
   moving said wastes along a predetermined path to a first station;
   reducing the size of said wastes to a predetermined maximum in said first station;
   firing said sized wastes in a reduced oxygen atmosphere at a temperature below about 2200°F;
   firing said materials a second time in an oxygen-rich atmosphere; and
   feeding back hot gases components obtained from said second firing to selected points along the path of movement of said wastes prior to firing for dehydrating said wastes.

2. Process for non-polluting disposal of solid wastes collected at a first location, which comprises:
   conveying said wastes along a predetermined path through a plurality of stations;
   reducing the size of said wastes to a predetermined maximum in one station;
   stoichiometrically firing said sized wastes at a temperature below about 2200°F;
   firing said materials a second later time in an oxygen-rich atmosphere; and
   directing the gaseous components obtained from said second firing to selected stations along the path of movement of said wastes prior to firing to dehydrate said wastes.

3. Process as in claim 2, including the further step of salvaging valuable components of the wastes prior to sizing.

4. Process as in claim 6, including the further step of redirecting low-oxygen gaseous components from the second firing onto the wastes during the first firing.

5. Process as in claim 2, in which the wastes are temporarily stored in a mass immediately prior to the first firing, and gaseous components from said second firing are conduited into the stored mass and released therewithin.

6. Process for converting solid wastes and waste liquid hydrocarbons to a non-polluting form, which comprises:

adding a quantity of presized wood to the solid wastes;

passing said solid wastes and wood through a sizing mill to reduce the same to a predetermined maximum;

temporarily storing said sized solid wastes and wood;

dehydrating said stored wastes and wood;

placing said dehydrated wastes and wood in a rotating kiln;

storing the waste liquid hydrocarbons in ventilated tanks;

firing said wastes and wood in said kiln with said waste hydrocarbons and ventilation air from said tanks in an oxygen-starved atmosphere;

completing combustion of said wastes and wood in an oxygen-rich atmosphere; and recirculating part of the gaseous materials obtained from the completed combustion into the oxygen-starved atmosphere of said kiln.

7. Process as in claim 6, in which the gaseous products from the completed combustion are passed through a water bath to remove suspended matter therefrom before release to the atmosphere.

8. Process as in claim 6, in which the temperature within the kiln while firing in an oxygen-starved atmosphere is maintained below about 2200°F.

9. Process as in claim 6, including the further step of recirculating part of the gaseous materials from the completed combustion through the solid wastes and wood in the sizing mill.

10. Process as in claim 6, including the following further steps between sizing and storing the wastes and wood, in the order given:

removing magnetizable items;

securing small particle non-combustibles; and reducing the remaining wastes and wood in a second sizing mill to a second predetermined maximum.

11. Process as in claim 6, in which hot gaseous products produced on completing combustion of said wastes and wood are used to power a steam boiler.

12. Process for converting solid wastes and waste liquid hydrocarbons to a non-polluting form, which comprises:

storing the waste liquid hydrocarbons in ventilated tanks;

mixing the waste liquid hydrocarbons with the solid wastes;

stoichiometrically firing said mixture with ventilation gases from said tanks added thereto; and subsequently firing said mixture in an oxygen-rich atmosphere.

13. Process as in claim 12, in which there is further provided the step of redirecting low-oxygen gaseous components from the second firing onto the mixture during the first firing.

* * * * *